Sept. 20, 1960  O. ZAUNER  2,952,943

TOOL FOR SHAPING GLASS VIALS

Filed May 2, 1957

INVENTOR.
OTTO ZAUNER
BY
W. A. SCHAICH &
LEONARD D. SOUBIER
ATTORNEYS

United States Patent Office 2,952,943
Patented Sept. 20, 1960

1

2,952,943
TOOL FOR SHAPING GLASS VIALS

Otto Zauner, Vineland, N.J., assignor to Kimble Glass Company, a corporation of Ohio Filed May 2, 1957, Ser. No. 656,531

2 Claims. (Cl. 49—7)

The present invention relates to tools for shaping the necks and mouths of glass vials and more particularly the invention pertains to a mouth forming tool adapted to finish the lip and interior surfaces of vial necks during their conveyance in a lineal direction.

It has been found that when the end of a vial neck is formed with the glass in plastic or workable condition while being moved along on a conveyor, the initial shaping of the neck portion is frequently inadequate to accurately dimension the mouth of the vial. Tools which have been employed heretofore have not been sufficiently well designed to furnish a shaping mandrel which is itself sufficiently adjustable to allow for deviations in the horizontal and vertical positions of a series of moving vials. The tools employed in prior practice for finishing the interior and exterior surfaces of the neck and lip respectively have consisted of essentially a unitary mandrel and lip shaper which have comprised relatively rigid tools with the mandrel portion extending through slotted disks restricted to either purely horizontal or vertical movement. The disks have consisted of accurately machined parts with the entire assembly constituting a much more complicated mechanism than that furnished by the present invention. One form of such mechanism for supporting the mandrels has been disclosed in Patent No. 2,738,622 to Koenig entitled, "Vial Necking Machines," which patent is assigned to the same parent assignee as the present application.

The difficulties of inadequate and improper alignment of the reshaping mandrel and the vial mouth are overcome by the present invention, one of the general objects of which is to provide an inexpensive shaping tool, the mandrel portion of which may be quickly and inexpensively replaced yet one which will produce accurate results.

Another object of the invention is to provide a shaping tool which is adaptable to forming the mouth and interior surface of the neck of glass vials such as syringe vials in a single operation while the glass is still plastic.

Another object of this invention is to provide a glass shaping tool which is adaptable to finishing the interior surfaces of the mouth and neck portions of glass vials while they are conveyed in a linear direction in spaced-apart recumbent positions immediately following the neck-forming operation.

The specific nature of this invention as well as other objects and advantages thereof, will become apparent to those skilled in the art from the following detailed description, taken in conjunction with the annexed sheet of drawings on which, by way of preferred example only, are illustrated the preferred embodiments of this invention.

On the drawings the subject tool is illustrated in a preferred embodiment suitable for tooling the lip and interior neck surfaces of glass syringe vials immediately after their formation. Due to the residual heat contained therein the vial necks are readily susceptible to reshaping and reforming in order to acquire accurate interior dimensions for receiving stopper-type closures of various types. The invention is equally applicable to tooling the surfaces of a wide variety of glass articles and is not to be considered as limited to the tooling of relatively small-sized glass vials.

Figure 1:
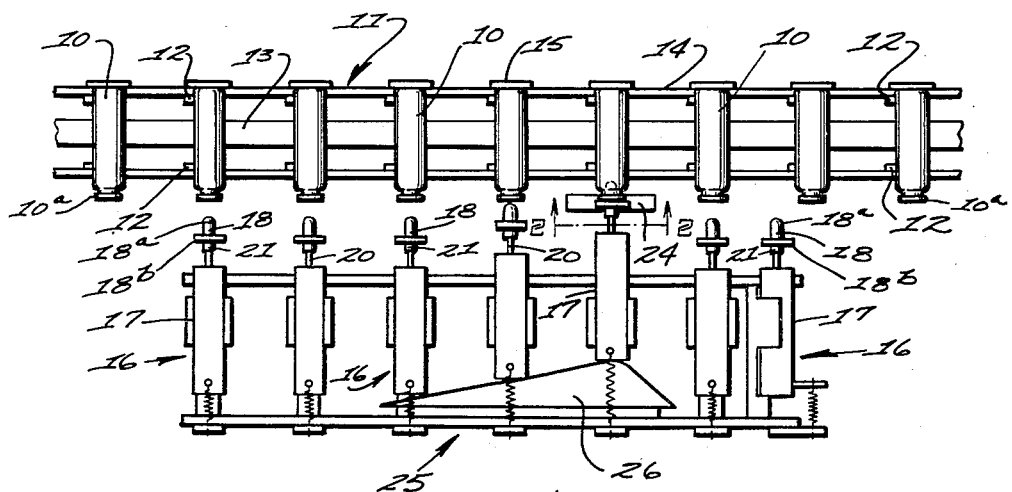
Fig. 1 is a plan view of a series of the shaping tools adapted to tooling the interior surfaces of a conveyed series of glass vials.

On the drawings as illustrated on Fig. 1, the glass vials 10 are conveyed in recumbent positions in a lineal direction in relatively uniform, spaced-apart relationship upon the conveyor 11 after being formed from suitable lengths of glass tubing, for example. In the initial stages of forming the vials 10, which does not constitute a necessary part of the subject invention, the bottom and neck portions of the vials are given a preliminary shape while the glass is at an elevated temperature. With the glass in a heat-softened condition the glass in the neck portion 10a may set up in a slightly out-of-round or slightly distorted condition which is undesirable in manufacturing precisely dimensioned articles.

The vials 10 are moved along on conveyor 11 by vertical lugs 12 and are rotated by a vial rotating belt 13 located therebetween which contacts the side walls of the vials. Belt 13 normally moves at a faster rate than and in the opposite direction to conveyor 11 to rotate the vials 10 at a faster rotational speed than is possible by merely rolling the vials along on conveyor rails 14. The bottoms of the vials are contacted by short vertical back-up plates 15 adjacent to lugs 12 on one side of the conveyor which serve to restrain the vials during tooling.

Figure 2:
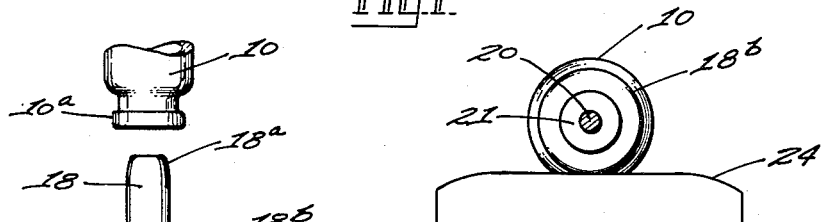
Fig. 2 is an enlarged vertical sectional view of the mandrel portion of the tool and glass vial taken along the line 2—2 of Fig. 1.

A plurality of the subject tools 16 are located at the tooling station as illustrated on Fig. 1 with the tools 16 having the same spacing and in the same plane as the vials 10 on conveyor 11. The similar tools 16 are attached to an endless belt 25 which operates at the same speed as conveyor 11. Tools 16 are arranged to operate in conjunction with conveyor 11 at the tooling station over a stationary anvil 24 adapted to support the vial necks during tooling as shown on Figs. 1 and 2. The tools 16 are spring mounted on belt 25 and horizontally moved into contact with the vials 10 by a cam 26.

Each of the tools 16 comprises a body 17 having a generally rectangular shape and a separable mandrel 18 for reforming the mouth and finishing the interior wall of vial necks 10a. The body 17 of the tool has a hollow bore or channel 19 integrally formed therein to receive a supporting part of the mandrel 18. The hollow channel 19 is closed at one end of the body 17 and opens exteriorly at the other. The open end of channel 19 of each tool 16 is arranged to face the conveyor 11 as shown on Fig. 1.

Figure 3:
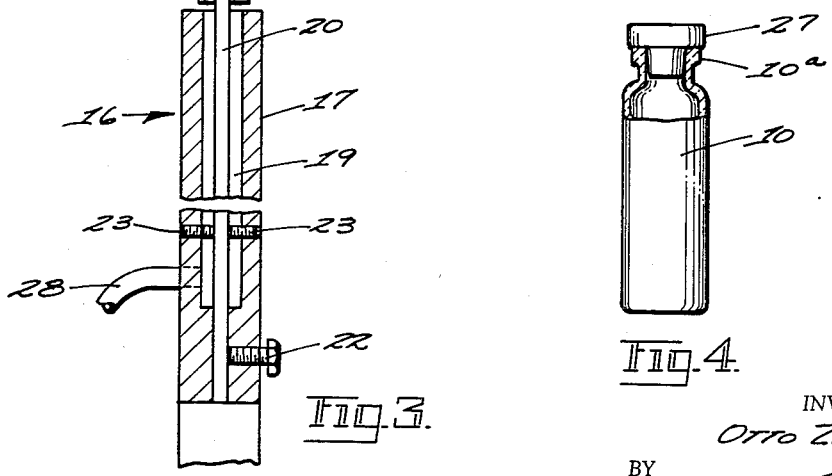
Fig. 3 is an enlarged horizontal sectional view of a single tool.

A resilient rod 20 is mounted within hollow channel 19 supported centrally therein at the closed end of the body 17 as shown on Fig. 3. The forming mandrel 18 of the tool is attached to the free end of rod 20 by a coupling member 21. Rod 20 is composed of spring steel or alloy, for example, and is of such diameter which will readily permit its cantilevering in all directions and especially in the horizontal plane to facilitate mandrel entry into the vial. A single set screw 22 may be employed to attach mandrel support rod 20 to tool body 17.

Mandrel 18 has smoothly contoured finishing surfaces with its central portion having a cylindrical shape and its extremity 18a being tapered with a frusto-conical shape. The shank of the mandrel has an enlarged radial flange or shoulder portion 18b which serves to shape the lip area of the rotating vial and to control its overall length between backing plate 15 when mandrel 18 is in its fully-engaged tooling position.

One or more set screws 23 extending into channel 19 hold the tool mandrel 18 in stationary position relative to the advancing mechanism of the conveyor 11. Screws 23 contact shaft 20 and thereby facilitate adjustment of its position within hollow channel 19. This variable adjustment may be employed to axially align the forming mandrel 18 with the advancing glass vials 10 so that the mandrel enters each rotating vial squarely. However, mandrel 18 is yieldably supported due to the nature of rod 20 to flex slightly if the vial to be tooled is slightly out of alignment or misshapen.

When the mandrel 18 is moved into full engagement with the rotating vial 10 by the closed end of tool 16 contacting angled stationary cam 26, the interior surfaces of the neck are tooled to a slightly greater diameter than the mandrel to produce precisely cylindrical surfaces.

The mandrel 18, coupling 21 and shaft 20 portions of the tool are separable as a unit from body member 17 which facilitates rapid and convenient replacement thereof within a brief interval without removing the body portion of the tool from endless belt 25. However, the complete tool 16 may be removed individually as required.

An opening is provided in tool body 17 extending into the closed end of channel 19 for introducing pressurized cooling air into the hollow cavity, the air passing outwardly in the direction of mandrel 18. With the relatively small diameter of shaft 20, and the use of cooling air, conductance of heat to the tool body 17 may be thereby minimized. Thus, tool 16 does not tend to become overheated. Air line 28 leading into the channel opening may be arranged as indicated on Fig. 3 if supplemental cooling air is desired or required.

Figure 4:
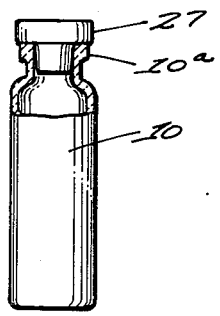
Fig. 4 is an elevational view partly in section of a glass vial.

A completed syringe vial 10 having an accurately dimensioned neck portion 10a is shown on Fig. 4 with a conventional closure 27.

Various modifications may be resorted to within the spirit and scope of the appended claims.

I claim:

1. In combination, apparatus for shaping mouth portions of hollow glass vials in heat-softened workable condition comprising conveying means adapted to transport said vials successively in a horizontal path in spaced-apart recumbent positions with their axes substantially transverse to the direction of travel, a stationary external forming anvil disposed adjacent to said conveying means over which the heat-softened mouth portions of said vials are singly conveyed in contact therewith during their horizontal travel, means adapted to rotate each of said vials during their conveyance over said anvil, a plurality of internal forming mandrels movable in an adjacent coplanar path at the same rate of travel as said conveyed vials, a lengthy resilient shaft supporting each of said mandrels in cantilevered relation, means for inserting each of said mandrels successively into each of said vials in contact with said anvil during their axial rotation and conveyance thereover, each of said mandrels being adapted to coaxial alignment with the mouth portion of each vial upon penetration thereof by flexure of its resilient mounting shaft, and cooling means adapted to supply continuously an impinging cooling gas directly to the resilient shaft and shaping surfaces of each of said mandrels.

2. In combination, apparatus for shaping mouth portions of hollow glass vials in heat-softened workable condition comprising conveying means adapted to transport said vials successively in a horizontal path in spaced-apart recumbent positions with their axes substantially transverse to the direction of travel, a stationary external forming anvil disposed adjacent to said conveying means over which the heat-softened mouth portions of said vials are singly conveyed in contact therewith during their horizontal travel, means adapted to rotate each of said vials during their conveyance over said anvil, a plurality of internal forming mandrels movable in an adjacent coplanar path at the same rate of travel as said conveyed vials, a lengthy resilient shaft supporting each of said mandrels in cantilevered relation, means for inserting each of said mandrels successively into each of said vials in contact with said anvil during their axial rotation and conveyance thereover, and each of said mandrels being adapted to coaxial alignment with the mouth portion of each vial upon penetration thereof by flexure of its resilient mounting shaft.

References Cited in the file of this patent

UNITED STATES PATENTS

| | | |
|---|---|---|
| 614,935 | Conde | Nov. 29, 1898 |
| 818,691 | House | Apr. 24, 1906 |
| 840,565 | Hutchins | Jan. 8, 1907 |
| 1,024,116 | Burrows | Apr. 23, 1912 |
| 1,335,733 | Hagemeyer | Apr. 6, 1920 |
| 1,643,215 | Koenig | Sept. 20, 1927 |
| 2,324,237 | Reichel | July 13, 1943 |
| 2,738,622 | Koenig | Mar. 20, 1956 |

FOREIGN PATENTS

| | | |
|---|---|---|
| 51,077 | Austria | Dec. 11, 1911 |